(12) United States Patent
Morita et al.

(10) Patent No.: US 8,579,764 B2
(45) Date of Patent: *Nov. 12, 2013

(54) CONTROL APPARATUS FOR IDLE-STOP SYSTEM MOUNTED ON VEHICLE WITH MANUAL TRANSMISSION

(75) Inventors: Tetsuo Morita, Nagoya (JP); Kenji Kawahara, Kariya (JP)

(73) Assignee: Denso Corporation, Kariya (JP)

( * ) Notice: Subject to any disclaimer, the term of this patent is extended or adjusted under 35 U.S.C. 154(b) by 104 days.

This patent is subject to a terminal disclaimer.

(21) Appl. No.: 13/239,816

(22) Filed: Sep. 22, 2011

(65) Prior Publication Data

US 2012/0083389 A1 Apr. 5, 2012

(30) Foreign Application Priority Data

Sep. 30, 2010 (JP) ................................. 2010-220539

(51) Int. Cl.
*B60K 26/00* (2006.01)
(52) U.S. Cl.
USPC ........................................................ 477/173
(58) Field of Classification Search
None
See application file for complete search history.

(56) References Cited

U.S. PATENT DOCUMENTS

| | | | | |
|---|---|---|---|---|
| 6,702,718 B2* | 3/2004 | Tani et al. | | 477/203 |
| 7,041,030 B2* | 5/2006 | Kuroda et al. | | 477/21 |
| 7,153,235 B2* | 12/2006 | Takamura et al. | | 477/172 |
| 7,448,982 B2* | 11/2008 | Freisinger et al. | | 477/181 |
| 8,246,517 B2* | 8/2012 | Senda et al. | | 477/121 |
| 2009/0298642 A1 | 12/2009 | Choi | | |
| 2010/0076656 A1 | 3/2010 | Hiyoshi et al. | | |
| 2010/0222973 A1 | 9/2010 | Senda et al. | | |
| 2012/0071298 A1* | 3/2012 | Morita | | 477/167 |
| 2012/0077640 A1* | 3/2012 | Saito et al. | | 477/183 |

FOREIGN PATENT DOCUMENTS

| | | |
|---|---|---|
| EP | 1 657 436 A2 | 5/2006 |
| EP | 2 223 835 A2 | 9/2010 |
| JP | A-2000-313253 | 11/2000 |
| JP | A-2006-138221 | 6/2006 |
| JP | A-2010-223216 | 10/2010 |
| JP | A-2010-275968 | 12/2010 |

OTHER PUBLICATIONS

Dec. 28, 2011 European search report issued in European Patent Application No. EP 11 18 3142.6.
U.S. Appl. No. 13/236,981, filed Sep. 20, 2011 in the name of Tetsuo Morita.

* cited by examiner

*Primary Examiner* — Dirk Wright
(74) *Attorney, Agent, or Firm* — Oliff & Berridge, PLC

(57) ABSTRACT

A control apparatus for an idle-stop system mounted on a manual-transmission-vehicle includes a restart unit performing a restart operation of the engine such that the restart unit drives a starter to restart the engine when a predetermined restart condition is met. The restart condition includes a condition where a clutch member is operated to allow the motive force to be transmitted between the output shaft of the engine and the driving wheel of the vehicle while the motive force has been blocked by the clutch, and a condition where the brake member is operated to stop applying the braking force to the wheel while the motive force has been blocked by the clutch. A forced stopping means is adapted to stop the wheels by forcibly applying the braking force to the wheels by operating a brake actuator during a predetermined period since the restart condition is met.

5 Claims, 8 Drawing Sheets

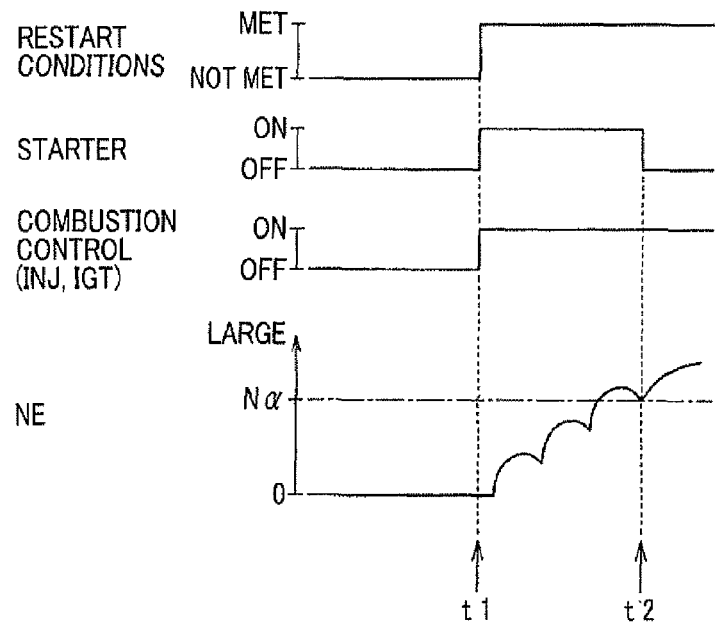
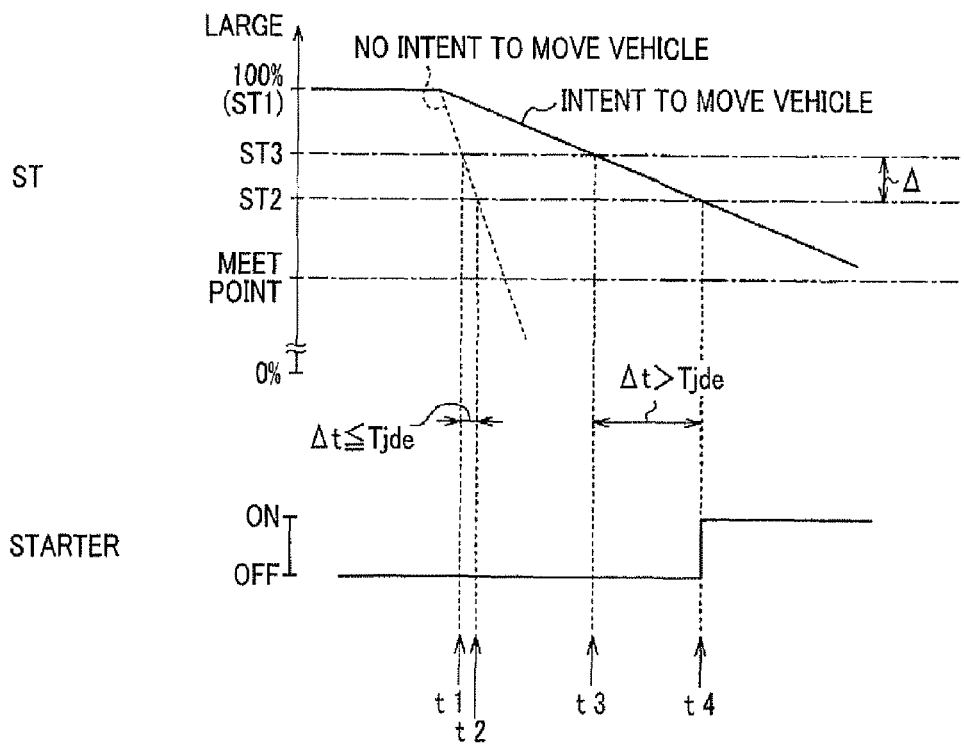

START RELEASING CLUTCH (WHEN MOVING ON UPSLOPE ROAD)
FIG.5A BRAKE
FIG.5B ACCELERATOR
FIG.5C RESTART CONDITION
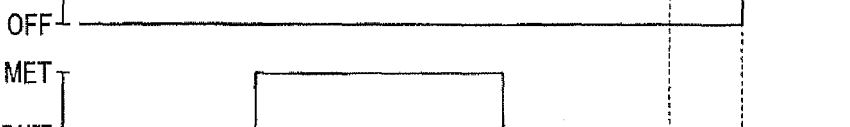
FIG.5D STARTER
FIG.5E COMBUSTION CONTROL
FIG.5F Pbrk
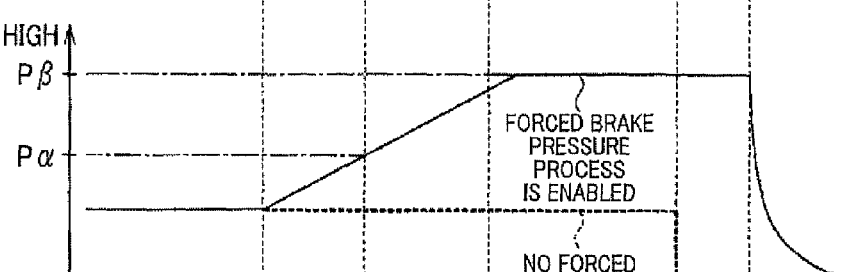
FIG.5G ST
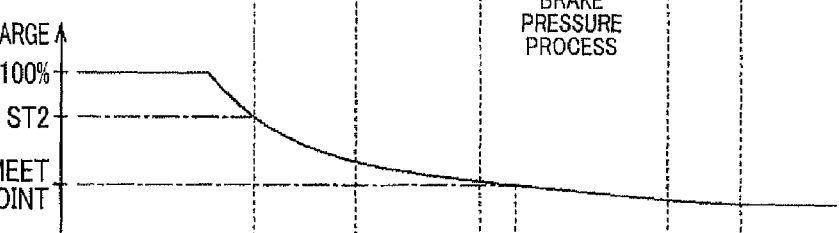
FIG.5H NE
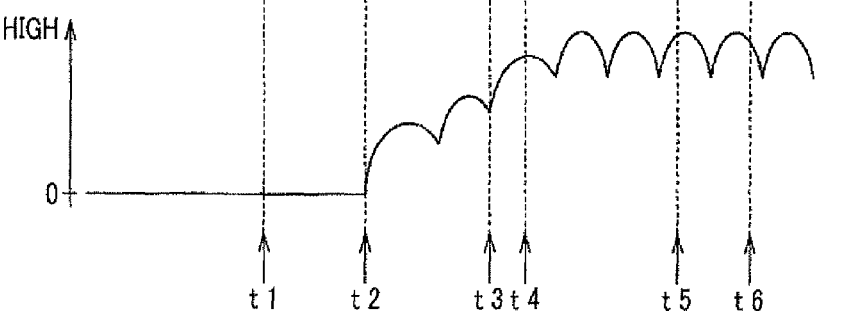

START RELEASING CLUTCH (WHEN ACCIDENTALY RELEASED: CLUTCH RELEASE RATE IS HIGH)
FIG.6A BRAKE
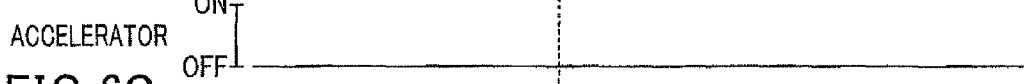
FIG.6B ACCELERATOR
FIG.6C RESTART CONDITION
FIG.6D STARTER
FIG.6E COMBUSTION CONTROL
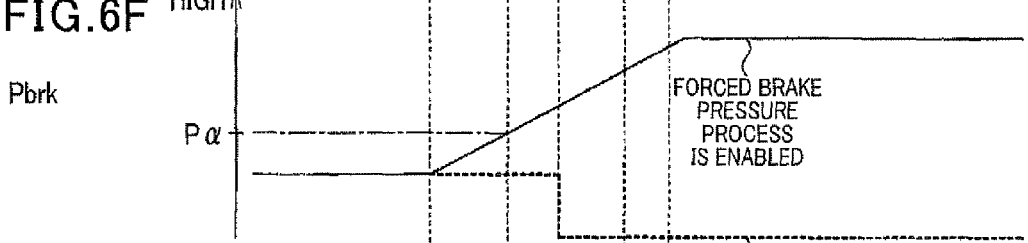
FIG.6F Pbrk
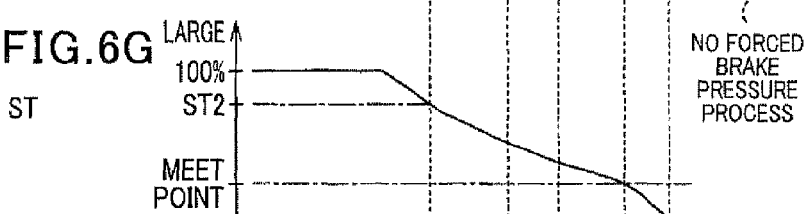
FIG.6G ST
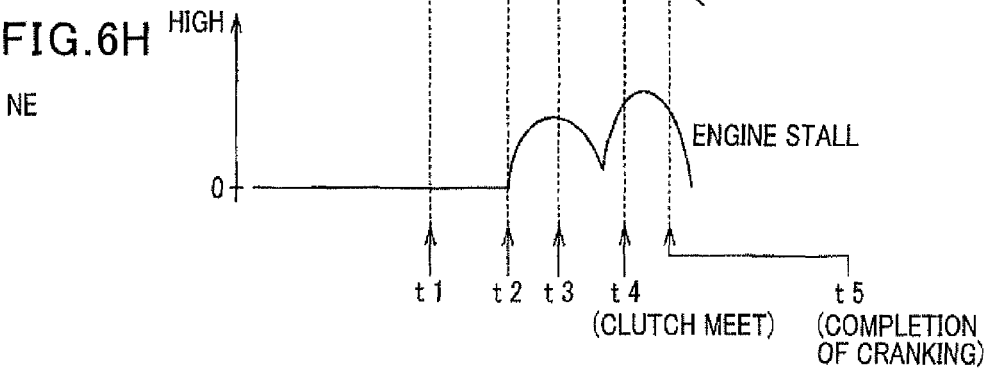
FIG.6H NE START RELEASING CLUTCH (WHEN ACCIDENTALY RELEASED: CLUTCH RELEASE RATE IS LOW)
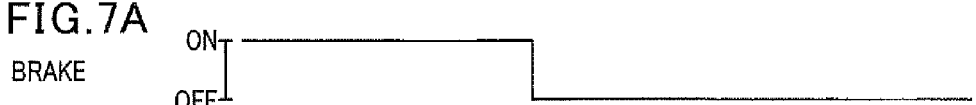
FIG. 7A BRAKE
FIG. 7B ACCELERATOR
FIG. 7C RESTART CONDITION
FIG. 7D STARTER
FIG. 7E COMBUSTION CONTROL
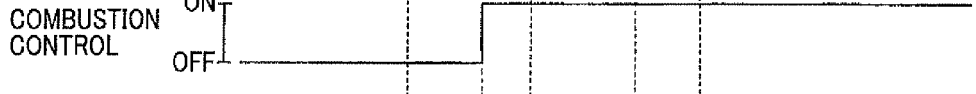
FIG. 7F Pbrk
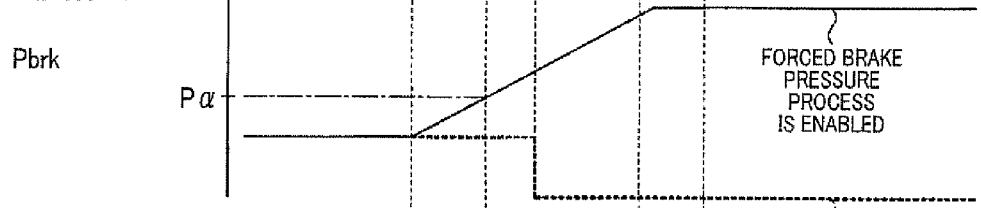
FIG. 7G ST
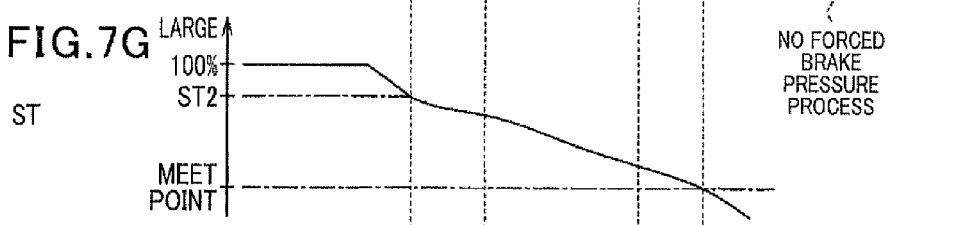
FIG. 7H NE
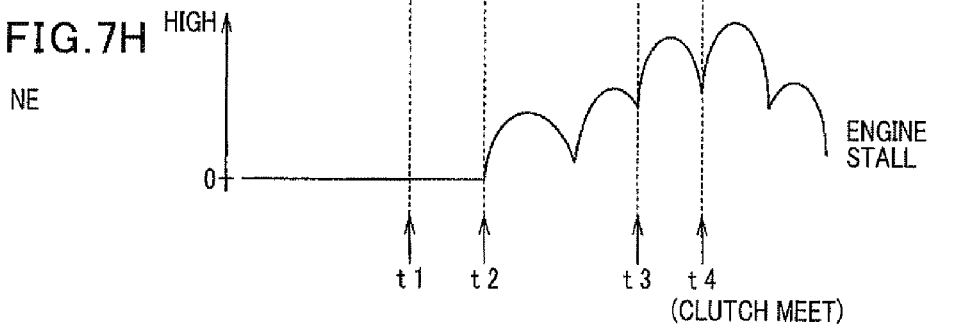

START RELEASING BRAKE

FIG.8A BRAKE — ON/OFF
— INTENT TO MOVE VEHICLE
— · — NO INTENT TO MOVE VEHICLE

FIG.8B ACCELERATOR — ON/OFF

FIG.8C RESTART CONDITION — MET/NOT MET

FIG.8D STARTER — ON/OFF

FIG.8E COMBUSTION CONTROL — ON/OFF

FIG.8F Pbrk — HIGH, $P\beta$, $P\alpha$
FORCED BRAKE PRESSURE PROCESS IS ENABLED
NO FORCED BRAKE PRESSURE PROCESS

FIG.8G ST — LARGE, 100%, MEET POINT

FIG.8H NE — HIGH, 0 t1  t2  t3  t4  t5
(CLUTCH MEET)

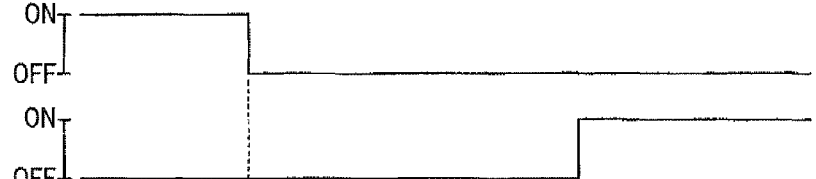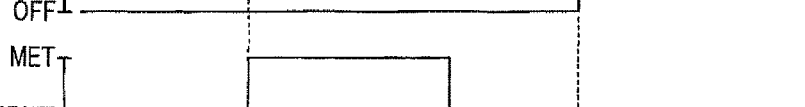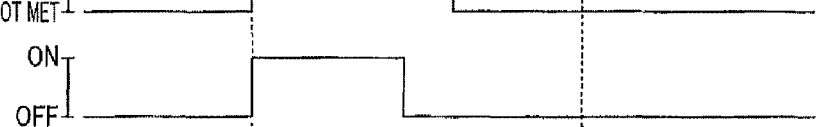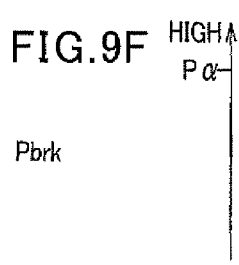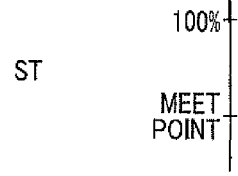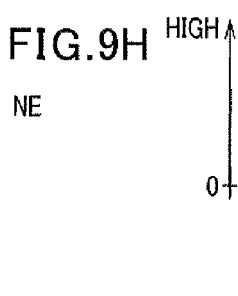

CONTROL APPARATUS FOR IDLE-STOP SYSTEM MOUNTED ON VEHICLE WITH MANUAL TRANSMISSION

CROSS-REFERENCE TO RELATED APPLICATION

This application is based on and claims the benefit of priority from earlier Japanese Patent Application No. 2010-220539 filed Sep. 30, 2010, the description of which is incorporated herein by reference.

BACKGROUND

1. Technical Field

The present invention relates to an idle-stop system of a vehicle, and more particularly to an idle-stop system of a vehicle with a manual-transmission.

2. Description of the Related Art

In recent years, an idle-stop system has been employed in vehicle systems. According to Japanese Patent Application Laid-Open Publication No. 2006-138221, the idle-stop system controls start/stop of the engine mounted on the vehicle such that the engine is automatically stopped when a predetermined stop condition is met and the engine is restarted by driving a starter to apply initial rotation at the output shaft of the engine (cranking operation) when a predetermined restart condition is met. Performing the idle-stop control makes it possible to increase the fuel-efficiency.

In a vehicle with a manual transmission, the vehicle is provided with the clutch that transmits or blocks motive power between the output shaft and the driving wheel by the driver operating the clutch operating member, and the following are proposed as the restart conditions for the engine: conditions including a condition that, under a circumstance in which the clutch is blocking the motive power between the output shaft and the driving wheel, the clutch operating member is operated such that the motive power is transmitted between the output shaft and the driving wheel; and conditions including a condition that, under the above-described circumstance in which the motive power is blocked, brake operation is released.

In more detail, when the above-described conditions involving clutch operation and brake operation are used as the restart conditions, the restart of the engine may happen if the restart conditions are met regardless of the driver having no intention of moving the vehicle. Specifically, the restart process of the engine may start when the driver accidentally release the clutch or the brake. Under these circumstances, when motive power is transmitted between the output shaft and the driving wheel by operation of the clutch, the vehicle may move regardless of the driver having no intention of moving the vehicle.

SUMMARY

An embodiment provides a control apparatus for a vehicle with a manual transmission in which an idle stop control is performed. Specifically, the control apparatus is designed in order to avoid that vehicle starts to move regardless of the driver having no intention of moving the vehicle.

As a first aspect of an embodiment, the control apparatus is used for a vehicle provided with a clutch to transmit or block a motive force between an output shaft of an engine mounted on the vehicle and a driving wheel of the vehicle, and provided with a brake unit to stop wheels including the driving wheel by applying a braking force to the wheels, the clutch being connected to a clutch member operated by a driver to transmit or block the motive force, the brake unit being connected to a brake member operated by the driver to stop the wheels. The control apparatus includes a restart unit performing a restart operation of the engine while the engine is in an automatic stop condition, the restart unit driving a starter to crank the engine when a predetermined restart condition is met thereby starting the engine; an actuator included in the brake unit, the actuator being used for applying the braking force to the wheels; and forced stopping means for stopping the wheels by forcibly applying the braking force to the wheels by operating the actuator during a predetermined period after the restart condition is met. The restart condition includes a condition in which the clutch member is operated to allow the motive force to be transmitted between the output shaft and the driving wheel while the motive force has been blocked by the clutch, and a condition in which the brake member is operated to stop applying the braking force to the wheel while the motive force has been blocked by the clutch.

According to the above-described embodiment, the forced stopping means forcibly applies the braking force to the wheels by the above-described manner. Therefore, when the restart operation is initiated regardless of the driver having no intention of moving the vehicle and when the motive force between the output shaft and the wheels is accidentally transmitted by the clutch operation, moving the vehicle can be reliably avoided.

According to a second aspect of the embodiment, the forced stopping means is configured to operate the actuator to stop applying the braking force when an accelerator member is depressed by the driver.

When the driver has an intention to move the vehicle, the driver operates the accelerator pedal. Therefore, according to the above-described embodiment, since the driver's intention can be recognized properly, the control apparatus can stop applying the forced-braking-force to the wheels.

According to the third aspect of the embodiment, the control apparatus further includes forbidding means for forbidding the restart operation by the restart unit until the braking force forcibly applied to the wheels reaches a predetermined value.

According to the above-described embodiment, even when the restart condition is met, executing the restart operation of the engine is forbidden until the braking force reaches the predetermined value. As a result, the restart operation of the engine can be started while enough braking force is applied appropriately to the wheels so that accidentally moving the vehicle can be avoided.

According to the fourth aspect of the embodiment, the control apparatus further includes judging means for judging whether or not an operation state of the clutch transitions from a blocking state where the motive force between the output shaft and the driving wheel is blocked to a transmission state where the motive force between the output shaft and the driving wheel is transmitted, during a period in which cranking is performed after the cranking starts by the restart operation, and the forced stopping means is configured to stop driving the starter when the judging means judges that the operation state of the clutch transitions to the transmission state.

Depending on the operation of the clutch member after the restart condition is met, the motive force is transmitted to the driving wheels from the output shaft while the cranking is performed by the restart operation. In this instance, since a driving torque of the starter is transmitted to the driving wheel and is used for power-running of the vehicle, inconveniences such as that the vehicle may move regardless of the driver having no intention of moving the vehicle or decreasing the reliability of the starter is likely to happen. However, in this regard, according to the above-described embodiment, when judging that the operating state of the clutch transitions to the above-described state where the motive force is transmitted to the driving wheels (clutch-meet state) from the state where the motive force is blocked (power-cutoff state), the control apparatus forcibly stops driving the starter. As a result, the above-described inconveniences such as that the driving torque of the starter is used for power-running of the vehicle can be avoided.

According to a fifth aspect of the embodiment, the restart unit is configured to perform a combustion control process in the restart operation, the combustion control process including a process to supply fuel to a combustion chamber of the engine from a fuel injection valve, and the forced stopping means is configured to stop the combustion control process when the judging means judges that the operation state of the clutch transitions to the transmission state.

According to the above-described embodiment, when judging means judges the operation state of the clutch transitions to the clutch-meet state, the combustion control process is forcibly stopped by the forced stopping means whereby the torque of the output shaft used for the power-running of the vehicle can be reduced properly.

BRIEF DESCRIPTION OF THE DRAWINGS

In the accompanying drawings:

FIG. 2 is a timing diagram showing a restart process for the engine according to the embodiment;

FIG. 3 is a timing diagram showing a restart condition for the engine according to the embodiment;

FIGS. 5A, 5B, 5C, 5D, 5E, 5F, 5G and 5H are timing diagrams showing an example of the forced brake pressure process according to the embodiment;

FIGS. 6A, 6B, 6C, 6D, 6E, 6F, 6G and 6H are timing diagrams showing an example of the forced brake pressure process according to the embodiment;

FIGS. 7A, 7B, 7C, 7D, 7E, 7F, 7G and 7H are timing diagrams showing an example of the forced brake pressure process according to the embodiment;

FIGS. 8A, 8B, 8C, 8D, 8E, 8F, 8G and 8H are timing diagrams showing an example of the forced brake pressure process according to the embodiment; and FIGS. 9A, 9B, 9C, 9D, 9E, 9F, 9G and 9H are timing diagrams showing an example of the forced brake pressure process according to other embodiment.

DETAILED DESCRIPTION OF THE PREFERRED EMBODIMENTS

With reference to the drawings, hereinafter will be described a control apparatus adapted for a vehicle provided with a manual transmission according to an embodiment of the present invention.

Figure 1:
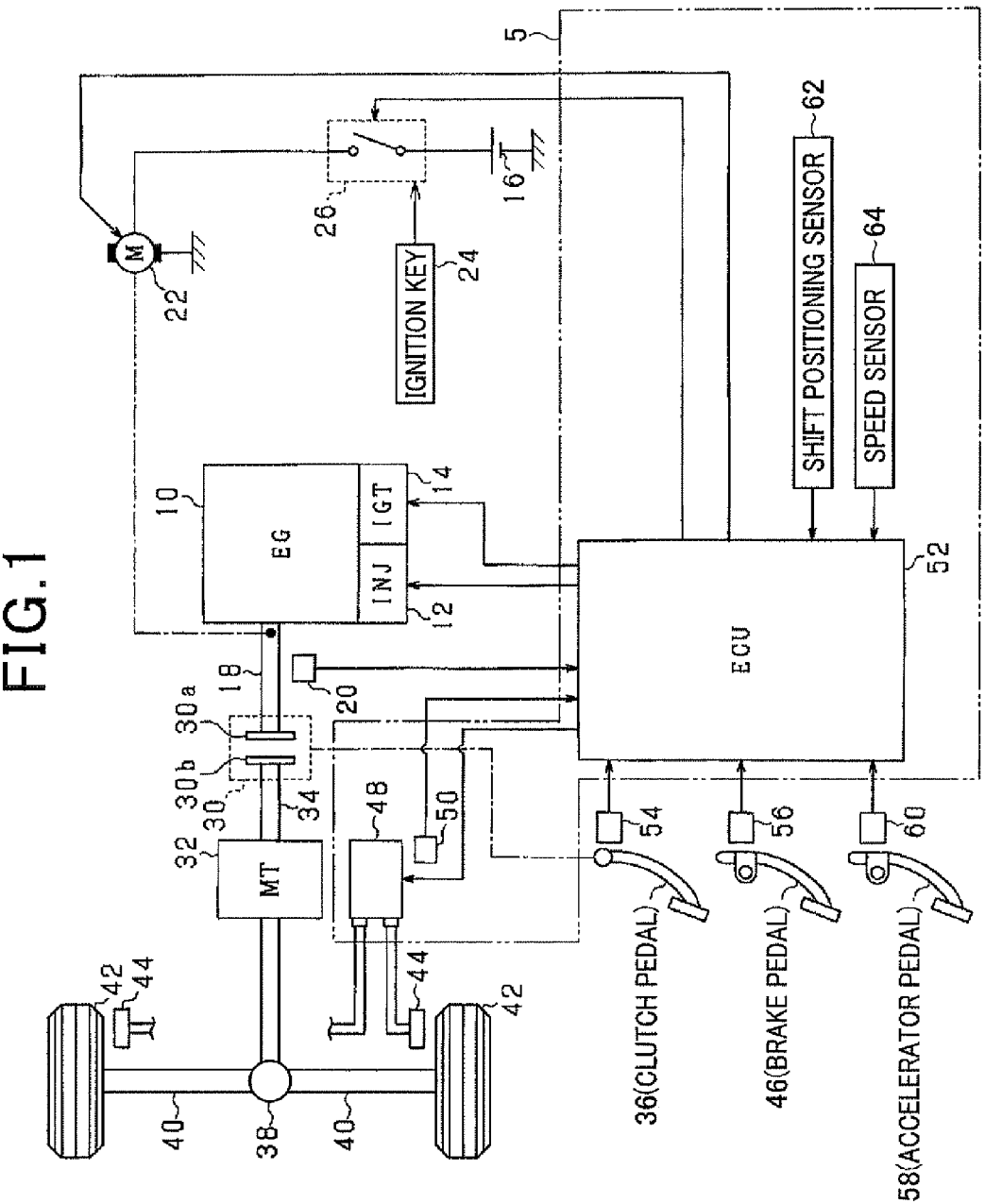
FIG. 1 is an overall system configuration according to an embodiment of the present invention.

FIG. 1 is an overall system configuration according to the embodiment.

The engine 10 as shown in FIG. 1 is categorized as a spark-ignition type multi-cylinder internal-combustion engine (gasoline engine). In more detail, each cylinder of the engine 10 includes a fuel injection valve 12 for supplying fuel to the combustion chamber of the engine 10 and a spark plug 14 to generate discharge spark in the combustion chamber. The air-fuel mixture from the fuel supplied by the fuel injection valve 12 and the intake air is ignited by the spark plug 14 and then burns. The energy generated by the combustion is extracted to be used as a rotational force of an output shaft (i.e., crank shaft 18) of the engine 10.

A crank angle sensor 20 to detect rotational angle of the crank shaft 18 is disposed around the crank shaft 18. According to the embodiment, the crank angle sensor 20 is designed to detect a rotational direction of the crank shaft 18 whereby the rotational position of the crank shaft 18 can be recognized whenever the rotational position is required. The information about the rotational position of the crank shaft 18 is used in the idle-stop control such that the information is used for a fuel injection control to quickly restart the engine 10 when restarting the engine 10 from the automatic stop condition.

A starter 22 is provided so as to crank the engine 10 by applying initial rotational force to the crank shaft 18. Particularly, the starter 22 is driven by a battery 28 as a power source when the starter switch 26 is turned ON because of the driver operating the ignition key 24, thereby applying initial rotational force to the crank shaft 18 (i.e., cranking operation).

The rotational force of the crank shaft 18 is transmitted to a manual transmission unit 32 via a clutch unit 30. The clutch unit 30 includes a disc 30a (flywheel), a disc 30b (clutch disc) connected to the input shaft 34 of the manual transmission unit 32. The state of these discs 30a and 30b are switched between contact and separation in response to the clutch pedal 36 (i.e., clutch member) being depressed by the driver.

According to the embodiment, an amount of depressing when the clutch pedal 36 is completely depressed (clutch stroke) is defined as 100% and the clutch stroke when the clutch pedal 36 is released is defined as 0%. When the clutch stroke becomes higher than a predetermined value (meet point e.g. 70%), these discs 30a and 30b separate from each other so that the operating state of the clutch unit 30 becomes cutoff state in which the power transmitted from the crank shaft 18 to the manual transmission unit 32 is cut off (power-cutoff state). Meanwhile, when the clutch stroke becomes lower than the meet point, these discs 30a and 30b contact each other so that the operating state of the clutch unit 30 becomes a contact state in which the power is transmitted from the crank shaft 18 to the manual transmission unit 32 (clutch-meet state).

The MT32 is configured as a manual transmission unit having a finite speed ratio where the speed ratio is changed by the driver such that a shift position of the shift unit (not shown) is manually operated by the driver to change the speed ratio. The MT32 is configured to include a multiple forward-gear (e.g. five-speed gear) and neutral gear (N). In the MT32, the rotational rate of the input shaft 34 is converted to a rotational rate based on the speed ratio. Further, the MT 32 transmits the rotational force of the crank shaft 18 to the drive wheel 42 via the output shaft (not shown) and the differential gear 38 of the MT 32 when the driver operates the shift position to be a driving state corresponding to 1st to 5th shift positions. Meanwhile, when the driver operates the shift position to be the neutral position, the MT32 disables transmitting the rotational force of the crank 18 to the drive wheel 42.

A brake unit applies braking force to the respective wheels including the above-described drive wheel 42. Specifically, the brake unit includes a brake 44 that applies braking force to the wheels and an electric-control brake actuator 48 that adjusts the hydraulic pressure of the hydraulic brake system (hydraulic brake pressure). The braking force of the brake 44 applied to the wheels becomes lager when the hydraulic brake pressure becomes larger because the brake stroke applied by the driver (i.e., an amount of depressing to a brake pedal 46 i.e., brake member) becomes larger or the brake actuator 48 is powered. The hydraulic brake system includes hydraulic pressure sensor 50 that detects the hydraulic brake pressure (e.g. master cylinder pressure). According to the embodiment, as a brake unit, it is assumed that the hydraulic pressure is increased by supplying power to the brake actuator 48 and the state of the hydraulic pressure is maintained, and then the hydraulic pressure is decreased when the power supply to the brake actuator 48 is stopped.

The electronic control unit (ECU 52) that controls the engine system is configured by a microprocessor including well-known CPU (central processing unit), ROM (read only memory), and RAM (random access memory). The ECU 52 receives various output signals from a clutch sensor 54 detecting a clutch stroke, a brake sensor 56 detecting a brake stroke, an accelerator sensor 60 detecting an amount of depressing at the accelerator pedal 58, a shift positioning sensor 62 detecting a shift-position of the shift unit, a speed sensor 64 detecting a running speed of the vehicle, a hydraulic pressure sensor 56 and a crank angle sensor 20. The ECU 52 executes various control programs stored in the ROM based on the above-described output signals thereby performing the fuel injection control by using the fuel injection valve 12 and a control process including a spark-ignition control by using the spark plug 14 and the idle-stop control.

Above-described idle-stop control is performed such that the engine 10 is stopped by stopping the fuel injection from the fuel injection valve 12 when a predetermined stop condition is met, and the engine 10 is restarted by driving the starter 22 and a combustion control process when a predetermined restart condition is met.

With reference to FIG. 2, the restart process is described as follows. When the restart condition is met at a time t1, the idle-stop process starts to drive the starter 22 so as to start the cranking operation and the combustion control process starts to operate fuel injection via the fuel injection valve and to generate the discharge spark at the spark plug 14. When the engine rotational rate NE based on the output of the crank angle sensor 20 exceeds a self-sustained drive enabling speed Nα (e.g. rotational rate ranging from 400 to 500 rpm) at a time t2, the idle-stop control stops driving the starter 22. As the engine rotational rate NE used as a threshold value to stop driving the starter 22, the minimum value of the engine rotational rate NE in which the rotational rate varies in a variation period that is an interval of the compression upper dead points (e.g. engine rotational rate at the compression upper dead point) can be used. The self-sustained drive enabling speed Nα is a rotational rate where the engine 10 can be driven without cranking by an engine torque generated by combustion of the air-fuel mixture in the combustion control process.

In other words, the self-sustained drive enabling speed Nα is a rotational force in which a torque to allow the crank shaft 18 to rotate in a forward direction overcomes a torque to allow the crank shaft 18 to rotate in a direction opposite to the forward direction whereby the crank shaft 18 continues to rotate in the forward direction. It is noted that the torque to allow the crank shaft 18 to rotate in the opposite direction is due to a pumping-loss or a friction-loss. Subsequently, the combustion control process completes the restart operation of the engine 10.

The above-described stop condition is determined to be capable of detecting intent of the driver to stop the vehicle. According to the embodiment, the above-described stop condition is defined as a logical AND operation between a condition that the running speed of the vehicle detected by the speed sensor 64 reaches a predetermined low-velocity e.g. zero and a condition that the operating state of the clutch unit 30 is cutoff state. The cutoff state of the clutch unit 30 is determined based on either the clutch stroke corresponds to a position completely depressed (100%) or the clutch stroke corresponds to a position larger than the meet-point and larger than a predetermined first threshold ST1 corresponding to a value little bit less than the position completely depressed.

Meanwhile, the above-described restart condition is when a logical OR operation of the following conditions (A) to (C) is met. These conditions are determined in terms of reducing the fuel efficiency being enhanced by the idle-stop control. The idle-stop control is performed to enhance the effect of reducing the fuel efficiency such that automatic stop period of the engine 10 is set to be longer based on expected operations by various operating members such as the clutch pedal 36, the brake pedal 46 when the driver attempts to start the vehicle.

(A) The brake pedal 46 is released from being depressed (brake release) while the operating state of the clutch unit 30 is cutoff and the shift position is set to be a drive state e.g. (first speed gear). It is noted whether or not the shift position being set to be the drive state may be detected based on the output value of the shift positioning sensor 62. Further, the brake release can be detected based on whether or not the brake stroke obtained by the output value of the brake sensor 56 becomes zero.

(B) The shift position is set to be a drive state while the operating state of the clutch unit 30 is cutoff and the brake pedal 46 is being depressed. It is noted whether or not the brake pedal 46 being depressed may be detected based on whether or not the brake stroke is larger than zero.

(C) The clutch pedal 36 is released from being depressed (clutch release) while the shift position is set to be the drive state and the brake pedal 46 is being depressed, and rate of the clutch release is low. It is noted whether or not the clutch being released is determined under a condition if the clutch stroke is lower than a predetermined second threshold value ST2 (e.g. 85%) which is smaller than the first threshold ST1 and larger than a value corresponding to the meet point. The second threshold value ST2 is set to be large enough to satisfy an expected necessary period from a time when the cranking starts by the restart process to a time when the engine rotational rate NE exceeds the self-sustained drive enabling speed Nα. Also, the second threshold value ST2 is set to be able to set a predetermined value Δ used for determining the intent of the driver to start the vehicle under a condition of a clutch release rate (described later).

In the above-described condition (C), the condition regarding the clutch release speed is provided to enable the intent of the driver to move the vehicle to be recognized as accurately as possible. In other words, for example, during automatic stop of the engine 10 when the shift position is the drive state, the operating state of the clutch device 30 is the motive power blocked state, and the brake pedal 46 is being depressed, the driver may mistakenly think that the engine 10 is being stopped by operation of the ignition key 24. As a result, the driver may accidentally perform the clutch release. In this instance, the restart process of the engine 10 may be performed as a result of the restart conditions being met, regardless of the driver having no intention of moving the vehicle. When the driver intends to move the vehicle, clutch release is performed slowly such as by a half-clutch operation being performed. On the other hand, when the driver does not intend to move the vehicle, the clutch release tends to be performed at once. As a result of providing the condition regarding the clutch release speed with focus on this point, a situation in which the engine 10 is restarted when the driver does not intend to move the vehicle can be prevented as much as possible.

As shown in FIG. 3, whether or not the clutch release speed is low may be judged based on whether or not the time (release time Δt) required for the clutch stroke ST to become less than the second threshold value ST2 after becoming less than a third threshold value ST3 (such as 90%) that is a value greater by the prescribed value Δ (such as 5%) than the second threshold value ST2 is longer than a judgment time Tjde. The judgment time Tjde may be set based on an experiment conducted in advance or the like, as time enabling differentiation of the release time (fastest release time, time t1 to time t2) when the clutch pedal 36 that is fully depressed is released at once, and the release time when the driver intends to move the vehicle (time t3 to time t4). Specifically, the judgment time Tjde is set to a time longer than the fastest release time and shorter than the release time when the driver intends to move the vehicle.

Although the restart conditions are set as described above, the restart process of the engine 10 may be performed regardless of the driver not intending to move the vehicle. A reason for this is that, even when the restart conditions are used, a situation occurs in which accurate recognition cannot be made of the driver not intending to move the vehicle. In other words, although the condition (C) of the restart conditions includes the condition regarding the clutch release speed to recognize the intent of the driver to move the vehicle, for example, regardless of the driver not intending to move the vehicle, the clutch release which requires the release time Δt to be recognized as longer than the judgment time Tjde may happen so that an erroneous judgment may be made that the driver intends to move the vehicle. Moreover, although the driver does not intend to move the vehicle, the driver accidentally performs the brake release so that the above-described condition (A) may be met.

When the restart process is starting, depending on the state of the clutch release subsequently performed by the driver, the operating state of the clutch 30 may be the clutch-meet state. In this case, regardless of the driver not intending to move the vehicle, the vehicle may start to run or a shock occur when the clutch meets, which will make the driver feel discomfort (feels the vehicle running).

According to the embodiment, in a period from a time when the restart condition is met to a time when the accelerator pedal 58 is depressed by the driver, a forced brake pressure process is performed to forcibly apply braking force to the wheels. The forced brake pressure process operates supplying power of the brake actuator 48. As a result, even when the restart process of the engine 10 accidentally starts regardless of the driver not intending to move the vehicle, an inconvenience such that the vehicle starts to move is avoided.

Figure 4:
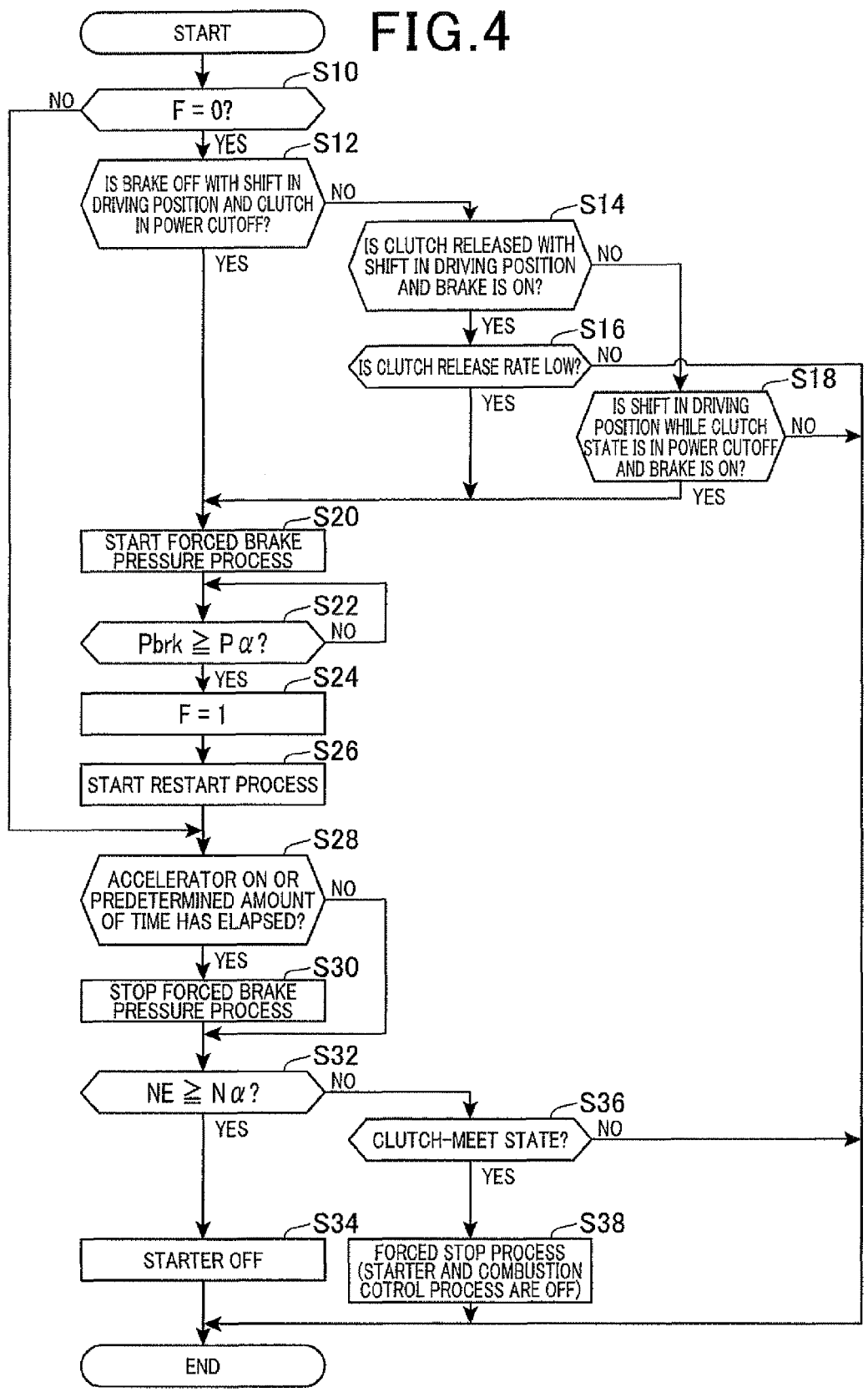
FIG. 4 is a flowchart showing a process of a forced brake pressure process according to the embodiment.

FIG. 4 is a flowchart showing a process of a forced brake pressure process according to the embodiment. This process is repeatedly executed (e.g. a predetermined period) by the ECU 52 after the engine 10 is automatically stopped.

In the series of processes, at Step S10, the ECU 52 judges whether or not a value of a brake pressure flag F is "0". The value of the brake pressure flag F being set to "0" indicates that a forced brake pressure process, described hereafter, has not yet been performed. The value being set to "1" indicates that the pressure process has already been performed. The value of the brake pressure flag F is stored in a memory of the ECU 52.

When judged at Step S10 that the value of the brake pressure flag F is "0", the ECU 52 judges whether or not the restart conditions of the engine 10 are met at Step S12 to Step S18.

As described above, the restart conditions prescribe that the logical sum of the above-described conditions (A) to (C) is true.

When judged that the restart conditions have been met in the above-described process, the ECU 52 proceeds to Step S20 and starts the forced brake pressure process. In more detail, brake hydraulic pressure Pbrk starts to increase so that the braking force to be applied to the wheels starts to increase.

At subsequent Step S22, the ECU 52 waits until brake hydraulic pressure Pbrk reaches a prescribed pressure Pα or more. The process is performed to judge whether or not sufficient braking force is applied to the wheels. The prescribed pressure Pα is set from the viewpoint of preventing sudden-start of the vehicle with certainty. Specifically, for example, the prescribed pressure Pα is set to brake hydraulic pressure required for achieving brake torque that is several times (such as three-times) the torque transmitted from the engine 10 to the driving wheel 42 while the engine 10 is idling. It is noted that when the brake hydraulic pressure Pbrk increases to a hydraulic pressure Pβ which is larger than the prescribed pressure Pα, the brake hydraulic pressure Pbrk is maintained at the prescribed pressure Pβ.

At subsequent Step S24, the ECU 52 sets the value of the brake pressure flag F to "1". At Step S26, the ECU 52 starts the restart process of the engine 10. Specifically, the ECU 52 waits until the brake hydraulic pressure Pbrk reaches the prescribed pressure Pα or more and enables executing the restart process. Initiating the restart process, the ECU 52 drives the starter 22 to crank the engine 10 and starts operation of the fuel injection via the fuel injection valve 12 and ignition by the ignition plug 14 are started.

When judged NO at Step S10 or when the process at Step S26 is completed, the ECU 52 proceeds to Step S28. The ECU 52 judges whether the logical sum of the condition that the depression operation of the accelerator pedal 58 by the driver is not performed and the condition that a predetermined amount of time has elapsed from the start of the forced brake pressure process is true. The process is performed to judge whether or not to stop the forced brake pressure process. The condition related to the operation of the accelerator pedal 58 is provided to appropriately recognize the intent to move the vehicle of the driver and stop the forced brake pressure process. In other words, when the driver moves the vehicle, the depression operation of the accelerator pedal 58 is performed. Therefore, the braking force applied to the wheels is required to be zero.

On the other hand, the condition that the predetermined amount of time has elapsed is provided to prevent reduction in the reliability of the brake actuator 48 caused by the drive time of the brake actuator 48 becoming long. Whether or not the depression operation of the accelerator pedal 58 is performed is judged based on an output value of the accelerator sensor 60. The predetermined time may be set based on evaluation results of an experiment conducted to test the reliability of the brake actuator 48.

When judged YES at Step S28, the ECU 52 proceeds to Step S30 and stops the forced brake pressure process. As a result, the brake hydraulic pressure Pbrk decreases and braking force is no longer applied to the wheels.

When judged NO at Step S28 or when the process at Step S30 is completed, the ECU 52 proceeds to Step S32 and judges whether or not the engine speed NE is the self-sustained drive enabling speed Nα or more.

When judged at Step S32 that the engine speed NE is the self-sustained drive enabling speed Nα or more, the ECU 52 proceeds to Step S34. The ECU 52 stops driving the starter 22 by turning OFF the starter switch 26 and ends cranking. The restart of the engine 10 is then completed.

On the other hand, when judged at Step S32 that the engine speed NE is less than the self-sustained drive enabling speed Nα, the ECU 52 proceeds to Step S36. The ECU 52 judges whether or not the operating state of the clutch device 30 has transitioned from the motive power blocked state to the clutch-meet state. Whether or not the operating state has transitioned to the clutch-meet state can be determined based on whether or not the clutch stroke ST is the meet point or less.

When judged at Step S36 that the clutch meet state is determined, the ECU 12 proceeds to Step S38 and perform a forced stop process to stop both driving of the starter 22 and the combustion control process. This process is performed to avoid inconveniences such that the vehicle may start to run regardless of the driver not intending to move the vehicle or reliability of the starter being degraded. In other words, depending on the state of the clutch pedal 36 to be operated by the driver after the restart condition is met, a clutch meet state of the clutch unit 30 may happen while the cranking is operated. In this instance, since a driving torque of the starter 22 or a torque generated by the combustion of the fuel is transmitted to the driving wheel 24 and is used for power-running of the vehicle, inconveniences such as that the vehicle may move or the reliability of the starter 22 decreases are likely to happen. Therefore, the ECU 12 forcibly stops both driving the starter 22 and the combustion control process so that the above-described inconveniences such as that the driving torque of the starter 22 is used for power-running of the vehicle can be avoided.

When the forced stop process is performed, the restart process of the engine 10 is interrupted and fuel injection and ignite operation to the respective cylinders is stopped whereby the engine 10 stalls. It is noted that a process notifying the driver may preferably be performed when the restart process of the engine 10 is interrupted. Specifically, for example, a notification may be indicated in an instrument panel of the vehicle thereby notifying the driver, or the driver may be notified by a sound. The brake pressure flag F is set to "0" when the forced brake pressure process is stopped.

Moreover, when the driver intends to move the vehicle and the forced stop process is performed, in the subsequent restart process, to avoid engine stalling by the forced stop process, the ECU 52 notifies the driver that the forced stop process is performed so as to prompt the driver to change the clutch release operation to avoid clutch meet state during the cranking period.

When judged NO at above-described Steps S16, S18 and S36, or process of Steps S34 and S36 is completed, these series procedure is ended.

FIGS. 5 to 8 are timing diagrams showing an example of the forced brake pressure process according to the embodiment. Specifically, in FIGS. 5 to 7, it is shown an example of the above-described procedure when the condition (C) as a restart condition is met. Further, FIG. 8 shows an example of the above-described procedure under the above-described condition (A) is met.

With reference to FIGS. 5A-5H, FIGS. 6A-6H, FIGS. 7A-7H, an example of the forced brake pressure process under the above-described condition (C) is met. FIG. 5A-5H show an example of the forced brake pressure process when the vehicle locates at an upslope road and the driver intends to move the vehicle. Specifically, FIG. 5A is a timing diagram showing whether or not the brake pedal 46 is depressed, FIG. 5B is timing diagram showing whether or not the accelerator pedal 58 is depressed, FIG. 5C is timing diagram showing whether or not the restart condition is met, FIG. 5D is timing diagram showing a driving state of the starter 22, FIG. 5E is timing diagram showing whether or not the combustion control process is executed, FIG. 5F is a timing diagram showing the brake hydraulic pressure Pbrk, FIG. 5G is a timing diagram showing the clutch stroke ST and the FIG. 5H is timing diagram showing the engine rotation rate NE.

As shown in the above-described drawings, at time t1, the clutch stroke ST decreases below the second threshold value ST2 whereby the ECU 52 judges that the above-described condition (C) as a restart condition is met and starts the forced brake pressure process. Subsequently, at time t2 where the brake hydraulic pressure Pbrk reaches the prescribed pressure Pα or more, as a restart process, the starter 22 is driven and the combustion control process is started. At time t3, the ECU 52 stops driving the starter 22 so as to stop the cranking, then the clutch is slowly released by half clutch operation. As a result, at time t4, the operating state of the clutch unit 30 becomes the clutch-meet state. Subsequently, after performing the brake release at time t5, the forced brake pressure process is stopped when the accelerator pedal 58 is depressed at time t6 whereby the braking force is not applied to the wheels so that the vehicle can start to move.

In FIG. 5F, the brake hydraulic pressure Pbrk when the forced brake pressure process is not applied (i.e., brake hydraulic pressure Pbrk in response to the brake stroke) is depicted by the dotted line as well. Performing the forced brake pressure process, braking force is applied to the wheel while brake pedal 46 is not being depressed by the driver (time t5 to t6). Therefore, when the vehicle starts to run on an upslope road, the vehicle can be held to avoid moving in reverse direction (hill hold control).

With reference to FIGS. 6A to 6H and FIGS. 7A to 7H, it is shown that the forced brake pressure process executed when the driver accidentally perform the clutch release regardless of the driver having no intention of moving the vehicle. It is noted that FIG. 6A to 6H and FIGS. 7A to 7H correspond to above-shown FIGS. 5A to 5H.

According to an example as shown in FIGS. 6A to 6H, the driver accidentally performs the clutch release earlier than an expected timing (early clutch release). When the early clutch release is performed, as shown by the double-dashed-chain line in FIG. 6D, a period from a time when the cranking starts to a time when the clutch stroke ST reaches the meet point (i.e., time t2 to t4) is shorter than a period from a time when the cranking starts to a time when the engine rotational rate NE reaches the self-sustained drive enabling speed Nα or more (time t2 to t5). Specifically, at time t4 during the cranking period in which the operating state of the clutch unit 30 is the clutch meet state, although the brake pedal 46 is not depressed, since both driving of the starter 22 and the combustion control process have been stopped and enough braking force is applied to the wheels by the forced brake pressure process at t4, it is avoided that the vehicle starts to move regardless of the driver having no intention of moving the vehicle. When driving of the starter 22 is stopped, subsequently an engine stalling occurs.

Meanwhile, according to an example as shown in FIGS. 7A to 7H, the driver accidentally performed the clutch release later than an expected timing (late clutch release). When the late clutch release is performed, a period from a time when the cranking starts to a time when the clutch stroke ST reaches the meet point (i.e., t2 to t4) is longer than a period from a time when the cranking starts to a time when the engine rotational rate NE reaches the self-sustained drive enabling speed Nα or more (t2 to t3). Specifically, at time t4 where the operating state of the clutch unit 30 is the clutch meet state, although the brake pedal 46 is not depressed, since enough braking force is applied to the wheels by the forced brake pressure process, it is avoided that the vehicle starts to move regardless of the driver having no intention of moving the vehicle. When driving of the starter 22 is stopped, subsequently the engine stalling occurs.

Next, with reference to FIGS. 8A to 8H, hereinafter is described the forced brake pressure process under the above-described condition (A) is met. It is noted that FIGS. 8A to 8H correspond to above-described FIGS. 5A to 5H.

With a solid line in FIGS. 8A to 8H, an example of the forced brake pressure process when the driver intends to move the vehicle is shown. Specifically, at t1, since the brake release is performed so that the ECU 52 determines that the above-described condition (A) is met as the restart condition. Hence, the forced brake pressure process is started. Subsequently, when the brake hydraulic pressure Pbrk reaches the prescribed pressure Pα or more at time t2, the ECU 52 starts the restart process including driving the starter 22 and the combustion control process. At time t4, the starter 22 being driven is stopped to stop the cranking and the forced brake pressure process is stopped at time t5 where the accelerator pedal is depressed.

As a result, the braking force is no longer applied to the wheels so that the vehicle is able to move.

As shown by the double-dashed-chain line in FIGS. 8A to 8H, an example procedure when the driver does not intend to move the vehicle is shown. Specifically, after the restart process starts when the brake release is accidentally performed by the driver, if the clutch release is performed mistakenly, operating state of the clutch unit 30 becomes clutch-meet state at time t3. However, since enough braking force is applied to the wheel by the forced brake pressure process and the ECU 52 stops driving of the starter 22 and the combustion control process at time t3, moving of the vehicle regardless of the driver having no intention of moving the vehicle can be avoided.

Thus, according to the embodiment, the forced brake pressure process is performed to forcibly apply the braking force to the wheels during the period from a time when the restart condition is met and to a time when the accelerator pedal 58 is depressed, whereby moving of the vehicle regardless of the driver having no intention of moving the vehicle can be avoided.

According to the above-described embodiment, following advantages can be obtained.

(1) The forced brake pressure process is performed to forcibly apply the braking force to the wheels during the period from a time when the restart condition is met and to a time when the accelerator pedal is depressed, whereby even when the restart process is initiated regardless of the driver having no intention of moving, moving of the vehicle can be avoided in advance.

(2) The forced brake pressure process is stopped when it is determined that the accelerator pedal 58 is depressed. Hence, the driver's intention can be recognized properly so that braking force is not applied to the wheels.

(3) Even when the restart condition is met, executing the restart process of the engine 10 is forbidden while the brake hydraulic pressure Pbrk reaches the prescribed pressure Pα or more. As a result, the restart process of the engine 10 can be started while the enough braking force is applied to the wheels and the vehicle moving accidentally can be avoided as well.

(4) The forced stop process is performed to forcibly stop driving the starter 22 when the ECU 52 determines the state of the clutch unit 30 changing to the clutch-meet state while cranking is performed by the restart process of the engine 10. As a result, degrading reliability of the starter 22 can be avoided. Further, as a forced stop process, the ECU 52 stops driving of the starter 22 and stops the combustion control process whereby driving torque of the starter 22 and generating the engine torque are stopped so that torque used for power-running of the vehicle can be significantly reduced. Moreover, performing the forced brake pressure process, excessive braking force being applied to the wheels can be avoided.

Other Embodiment

The above-described embodiment can be modified as follows. The start timing of the forced brake procedure is not limited to the one from the above-described embodiment. For instance, the start timing may be changed to timing when the stop condition of the engine 10 is met.

As to the start timing of the restart process, it is not limited to the timing of the brake hydraulic pressure Pbrk being reached to the prescribed pressure Pα. For example, as shown in FIGS. 9A to 9H, a timing t1 at which the forced brake pressure process is started can be used as the alternative start timing of the restart process as long as an increase-ratio of the brake hydraulic pressure Pbrk is high. In this instance, the starter 22 is started to driven and the combustion control process is started at the timing where the restart condition is met. It is noted that the FIGS. 9A to 9H correspond to the above-shown FIGS. 5A to 5H.

According to the above-described embodiment, the forced brake pressure process increases the brake hydraulic pressure Pbrk to be pressure Pβ which is higher than the prescribed pressure Pα. However, it is not limited to this process. For instance, as shown in FIG. 9F, the ECU 62 determines that the brake hydraulic pressure Pbrk reaches the prescribed pressure Pα at time t2, the brake hydraulic pressure Pbrk may be maintained at prescribed pressure Pα. Further, as shown by a chain line in FIG. 9F, the brake hydraulic pressure Pbrk may be maintained at a pressure value corresponding to a position of the brake pedal 46 which is completely depressed Regarding how to determine whether or not the operating state of the clutch unit 30 transitions to the clutch-meet state from the cutoff state, it is not limited to the above-described embodiment. For example, when the clutch stroke ST is determined as a value lower than a predetermined value which is lower the meet point, the ECU 52 can determines that the operating state of the clutch unit 30 transitions to the clutch-meet state. In this instance, the period from a time when the cranking starts by the restart process to a time when the operating state of the clutch unit 30 becomes longer so that frequency of the engine stall triggered by the forced decreases while the cranking is performed may be decreased. Therefore, it may be avoided to decrease the driveability for the driver having intention to move the vehicle. However, in this regard, it is considered that the driving torque of the starter 22 is often used for power-running of the vehicle. Hence, to keep the reliability of the starter 22, the above-described predetermined threshold values preferably is set so as to avoid the torque transmitted from the crank shaft 18 to the input shaft 34 of the MT32 via the clutch unit 30 (clutch capacity) becoming excessively high.

As to the brake unit, it is not limited to the one in the above described embodiment. For instance, a brake unit having a mechanism capable of maintain the brake hydraulic pressure Pbrk even when the power supply to the brake actuator 48 is stopped may be used. In this instance, to forcibly apply the braking force to the wheels in a predetermined period from the restart condition is met, a method in which the power supply to the brake actuator 48 is stopped when the brake hydraulic pressure Pbrk reaches the prescribed pressure Pα after the power supply to the brake actuator 48 is started prior to the restart condition being met (e.g. at a time when the stop condition of the engine 10 is met) can be employed. In other words, the braking force can be applied to the wheels at a time when the restart condition is met even the power is not supplied to the brake actuator 48.

Regarding to the internal-combustion engine, the above-described embodiment is not limited to the spark-ignition type internal-combustion engine. However, a compression ignition engine such as diesel engine can be used for the internal combustion engine.

According to the above-described embodiment, the brake unit is the hydraulic brake. However, the brake unit is not limited to the hydraulic type brake, for example, an air brake can be employed.

What is claimed is:

1. A control apparatus for a vehicle provided with a clutch to transmit or block a motive force between an output shaft of an engine mounted on the vehicle and a driving wheel of the vehicle, and provided with a brake unit to stop wheels including the driving wheel by applying a braking force to the wheels, the clutch being connected to a clutch member operated by a driver to transmit or block the motive force, the brake unit being connected to a brake member operated by the driver to stop the wheels, the apparatus comprising:

a restart unit performing a restart operation of the engine while the engine is in an automatic stop condition, the restart unit driving a starter to crank the engine when a predetermined restart condition is met thereby starting the engine;

an actuator included in the brake unit, the actuator being used for applying the braking force to the wheels; and forced stopping means for stopping the wheels by forcibly applying the braking force to the wheels by operating the actuator during a predetermined period after the restart condition is met, wherein the restart condition includes a condition in which the clutch member is operated to allow the motive force to be transmitted between the output shaft and the driving wheel while the motive force has been blocked by the clutch, and a condition in which the brake member is operated to stop applying the braking force to the wheels while the motive force has been blocked by the clutch.

2. The control apparatus according to claim 1, wherein the forced stopping means is configured to operate the actuator to stop applying the braking force when an accelerator member is depressed by the driver.

3. The control apparatus according to claim 1, further comprising forbidding means for forbidding the restart operation by the restart unit until the braking force forcibly applied to the wheels reaches a predetermined value.

4. The control apparatus according to claim 1, further comprising judging means for judging whether or not an operation state of the clutch transitions from a blocking state where the motive force between the output shaft and the driving wheel is blocked to a transmission state where the motive force between the output shaft and the driving wheel is transmitted, during a period in which cranking is performed after the cranking starts by the restart operation, and the forced stopping means is configured to stop driving the starter when the judging means judges that the operation state of the clutch transitions to the transmission state.

5. The control apparatus according to claim 4, wherein the restart unit is configured to perform a combustion control process in the restart operation, the combustion control process including a process to supply fuel to a combustion chamber of the engine from a fuel injection valve, and the forced stopping means is configured to stop the combustion control process when the judging means judges that the operation state of the clutch transitions to the transmission state.

* * * * *